No. 824,862. PATENTED JULY 3, 1906.
H. R. HILTON.
HOE.
APPLICATION FILED NOV. 18, 1905.
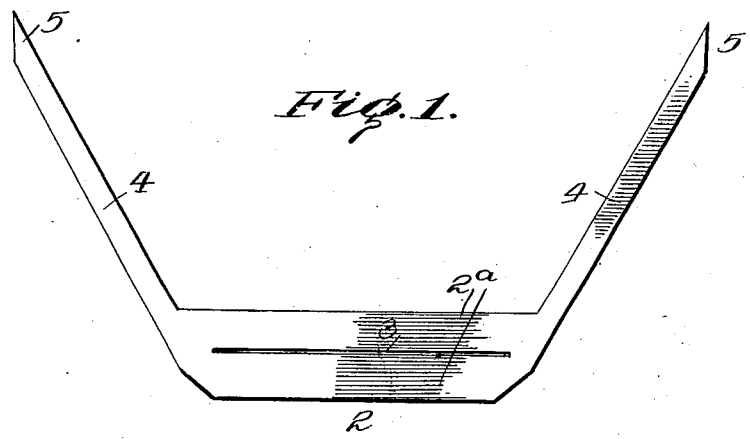
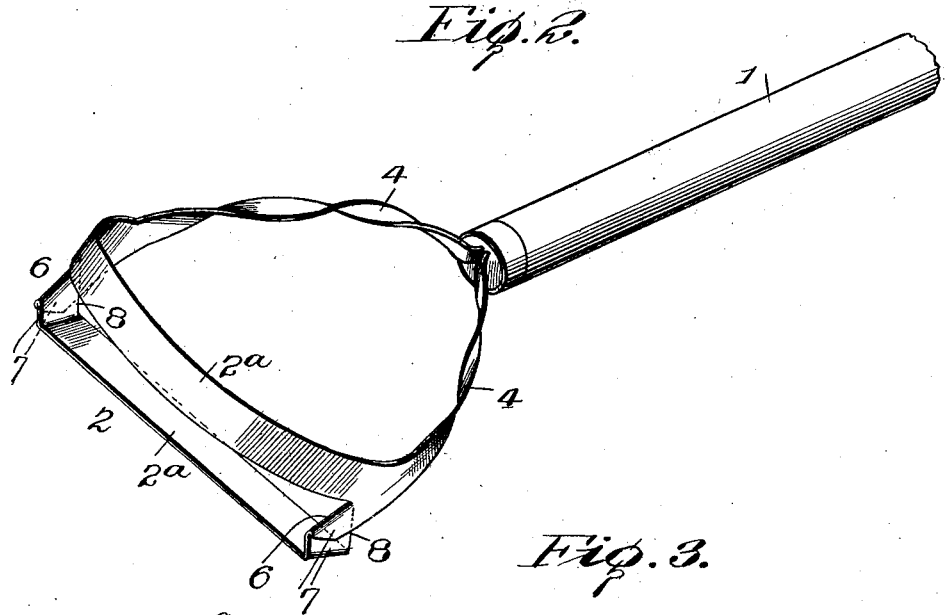
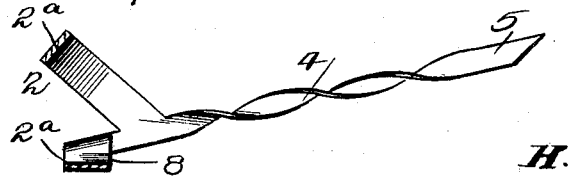
Inventor
H. R. Hilton.
Witnesses

UNITED STATES PATENT OFFICE.

HUGH R. HILTON, OF PORT ALLEGANY, PENNSYLVANIA.

HOE.

No. 824,862.    Specification of Letters Patent.    Patented July 3, 1906.

Application filed November 18, 1905. Serial No. 287,966.

*To all whom it may concern:*

Be it known that I, HUGH R. HILTON, a citizen of the United States, residing at Port Allegany, in the county of McKean and State of Pennsylvania, have invented certain new and useful Improvements in Hoes, of which the following is a specification.

The object of my invention is to provide an improved hoe, particularly designed for use as a mulching-tool for garden tillage, which is so constructed that it may be conveniently manipulated to loosen the top soil rapidly, so as to leave the loosened surface to dry out and protect the moisture beneath it and by operator walking backward instead of forward leave the stirred soil free from footprints that injure the mulch, as is the case where the operator follows the hoe and tramps on the soil freshly worked.

A further object is to pulverize the soil thoroughly and rapidly and make an ideal seed-bed; and a further object of the invention is to provide a hoe of this character which may be easily and cheaply made out of one integral piece of sheet metal, which will be durable in construction, and which will be efficient in operation for all the uses to which a device of this general character may be put.

For a full description of the invention and the merits thereof and also to acquire a knowledge of the details of construction of the means for effecting the result reference is to be had to the following description and accompanying drawings, in which—

Figure 1 is a view illustrating the blank from which my improved hoe is preferably formed. Fig. 2 is a perspective view of the hoe. Fig. 3 is a transverse longitudinal sectional view.

Corresponding and like parts are referred to in the following description and indicated in all the views of the drawings by the same reference characters.

Referring to the drawings, the numeral 1 designates the handle of my improved hoe, which may be made in any desired manner.

2 designates the hoe proper. The hoe proper in its preferred construction is formed out of one piece of sheet metal, the blank form of which is illustrated in Fig. 1, and it consists of a transverse member 2, provided with a longitudinal slit 3, and is also provided at its ends with brace portions 4, intended for connection to the handle 1 in any preferred manner. After the blank has been cut in the form shown in Fig. 1, with the slit 3 therein, the two sections $2^a$, produced by the said slit, are separated, and the end portions 4, which constitute the brace of the hoe, are converged at their free ends and are preferably twisted, as shown, or may be bent double to strengthen them, and their free ends may be joined together in any desired manner to constitute a tang portion 5 to be entered in the end of the hoe-handle 1, as shown. One of the sections $2^a$ is arched, as shown, and extends in transverse section in a plane oblique to the plane of the handle 1, and the other section $2^a$ is bent at its ends with a diagonal crease 6 and extends from end to end in a straight line spaced from the other section, and also, transversely considered, in a plane oblique to the plane of the handle.

It will be observed then that the complete structure embodies two spaced-apart blades constituted by the separated sections $2^a$, one of said blades extending transversely in a straight line from end to end and provided at each end with a diagonal crease, the two portions of which overlap in an angular direction to strengthen the structure at the corners and produce an angular cutting edge 8 at each side of the hoe, and it will also be noted that in addition to the straight cutting-blade the hoe also embodies a curved or arched cutting-blade spaced from the other blade and producing an arrangement by which the hoe may be readily reversed, so as to present either blade to the ground. Each of the blades in its construction forms a transverse brace for the other.

In the practical application of my improved hoe the disposition of each blade with respect to the plane of the handle insures that no matter which way the hoe is used it will always lie flat upon the ground when the handle is at the proper angle for work. By using the hoe with a short sharp stroke the soil will be pulverized rapidly, and by using the long stroke and cutting in both directions the top soil will be loosened rapidly, so that the loosened surface may be left to dry out and protect the moisture below. By tilting the handle above and below the ordinary position or angle in which such handle is used one edge of the hoe or the other will bite into the ground, and weeds will be cut down, and the soil pulverized with the same motion. By providing the angular cutting edge 8 weeds may be cut down close to the growing plants in places where they would be inaccessible to a hoe used in its normal position with one blade or the other presented broad side to the ground.

From the foregoing description in connection with the accompanying drawings it will be seen that I have provided an improved hoe which may readily be used with either straight or curved blade in engagement with the ground and which may be manipulated to effectually loosen top soil, so as to admit the warm air freely and dry the soil to produce an effective mulch. It can also be operated by walking backward or forward and can be operated so that no footprints need be made in the finished work.

Having thus described the invention, what is claimed as new is—

1. A hoe provided with two spaced-apart blades, one of which is straight and the other curved, transversely.

2. A hoe, comprising a handle and a hoe proper, the latter being provided with two spaced-apart blades, one of which is transversely curved and the other of which extends transversely in a straight line, each of said blades having its faces disposed obliquely with respect to the plane of the handle.

3. A reversible hoe provided with spaced-apart blades, one of said blades being curved, and the other of said blades being provided with angular ends and extending from end to end in a substantially straight line.

4. A hoe comprising a handle and a hoe proper constructed of one piece of metal and consisting of spaced-apart blades and braces connecting said blades with the handle.

5. A hoe comprising a handle, and a hoe proper constructed of a single piece of metal provided with a transverse slit and end portions constituting braces secured to the handle, an arched blade bounding one side of said slit and a straight blade bounding the other.

6. A hoe, comprising a handle and an integral hoe proper consisting of braces, an arched blade and another blade spaced from the arched blade and provided with diagonally-creased end portions producing angular cutting edges.

In testimony whereof I affix my signature in presence of two witnesses.

HUGH R. HILTON. [L. S.]

Witnesses:
   W. E. SPRINGER,
   C. A. DIFFIN.